United States Patent [19]
Wise

[11] 3,977,477
[45] Aug. 31, 1976

[54] COMBINATION GARDEN IMPLEMENT APPARATUS

[76] Inventor: James Glenn Wise, 3725 NW. 34, Oklahoma City, Okla. 73112

[22] Filed: Dec. 12, 1974

[21] Appl. No.: 531,973

Related U.S. Application Data

[63] Continuation-in-part of Ser. No. 386,006, Aug. 6, 1973, abandoned.

[52] U.S. Cl. ................................ 172/246; 172/192; 172/247; 172/355; 280/47.18; 280/47.31; 280/47.33
[51] Int. Cl.² ..................... A01B 49/04; A01B 1/20; B62B 1/20
[58] Field of Search ............ 172/354, 355, 357–359, 172/363, 365, 366, 245–247, 192, 698; 280/47.18, 47.3–47.33

[56] References Cited
UNITED STATES PATENTS

| | | | |
|---|---|---|---|
| 85,709 | 1/1869 | Treffiz et al. | 172/359 X |
| 95,718 | 10/1869 | Callahan | 172/246 |
| 153,865 | 8/1874 | Vosburg | 172/698 X |
| 186,606 | 1/1877 | O'Callaghan | 172/246 |
| 282,202 | 7/1883 | Lee | 172/246 |
| 316,164 | 4/1885 | Moulton | 172/192 X |
| 558,492 | 4/1896 | Hick | 172/354 X |
| 606,835 | 7/1898 | Douglas | 172/354 X |
| 764,051 | 7/1904 | Hanger | 172/355 |
| 1,113,563 | 10/1914 | Kevitt | 172/246 |
| 1,319,686 | 10/1919 | Bannister | 172/246 |
| 1,623,321 | 4/1927 | Smith et al. | 172/247 X |
| 1,641,032 | 8/1927 | Gibbs | 172/254 X |
| 2,047,498 | 7/1936 | Thew | 172/359 |
| 2,326,739 | 8/1943 | Andrews | 270/47.18 |
| 2,382,030 | 8/1945 | Sievert | 172/359 |
| 2,591,420 | 4/1952 | Gillespie | 172/192 |
| 2,593,944 | 4/1952 | Walters, Jr. et al. | 172/359 X |
| 2,797,125 | 6/1957 | Vogler | 280/47.18 X |
| 3,106,408 | 10/1963 | Tomaivolo | 280/47.3 UX |
| 3,488,091 | 1/1970 | Baker | 280/47.31 X |

FOREIGN PATENTS OR APPLICATIONS

| | | | |
|---|---|---|---|
| 662,814 | 8/1929 | France | 280/47.31 |
| 61,387 | 8/1891 | Germany | 172/192 |

*Primary Examiner*—Edgar S. Burr
*Assistant Examiner*—Steven A. Bratlie
*Attorney, Agent, or Firm*—Laney, Dougherty, Hessin & Fish

[57] ABSTRACT

An improved garden implement that is a combination soil working and cartage implement which is comprised of a wheeled, hand powered cultivator with subsoiler capable of receiving a cartage bed for selective use as a wheelbarrow type implement. The implement consists of a hand powering frame carrying cultivator blades and a subsoil cutter blade, which frame can be turned over to then receive a cartage bed in rapid affixure for use as a wheelbarrow type of implement.

2 Claims, 6 Drawing Figures

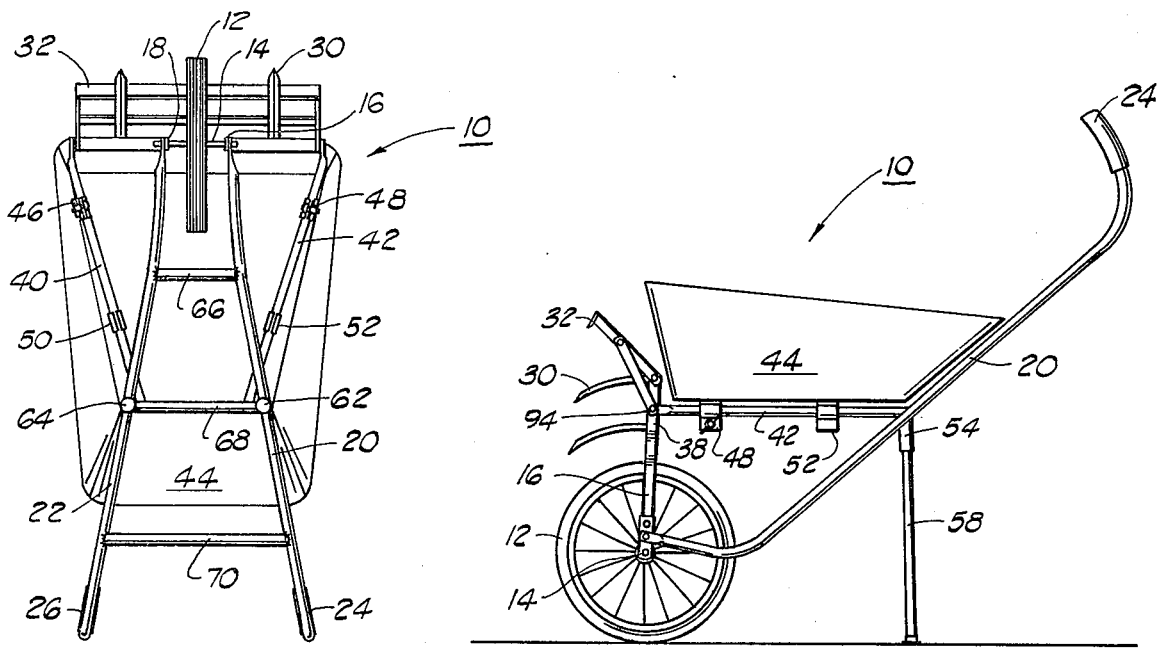
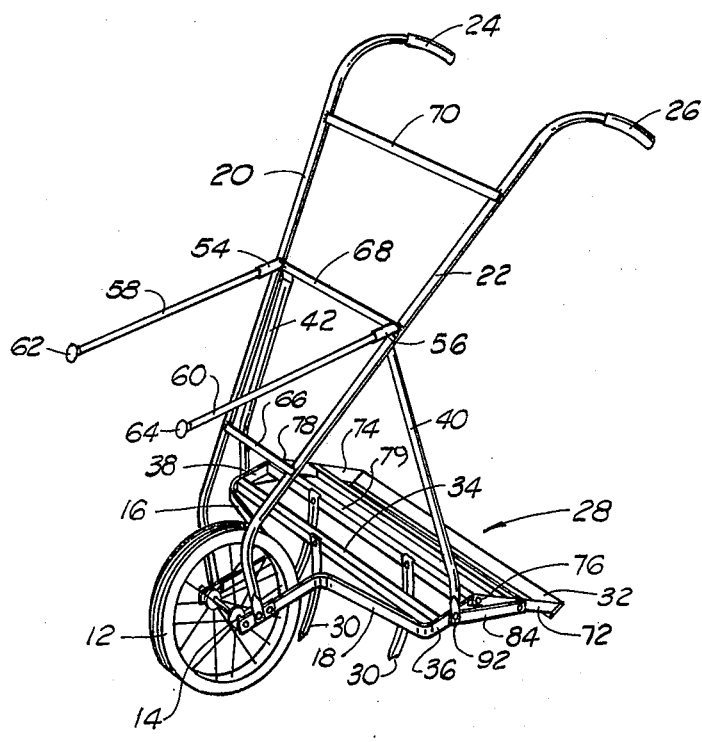

COMBINATION GARDEN IMPLEMENT APPARATUS

CROSS REFERENCE TO RELATED APPLICATION

This application is a continuation-in-part of application Ser. No. 386,006 entitled "Garden Plow with Subsoil Cutting Blade" as filed on Aug. 6, 1973 now abandoned.

BACKGROUND OF THE INVENTION

1. Field of the Invention

This invention relates to a combination garden implement constituted of a wheeled frame having a subsoil cutting blade combined with cultivating blades which is further convertible into a wheelbarrow type of implement.

2. Brief Description of the Prior Art

The prior art includes numerous types of hand powered garden implements including cultivators, subsoilers and the like as well as various types of hand powered cartage implements or wheelbarrows. To applicant's knowledge this is the first such teaching where a single wheel supported frame which includes hand propulsion gripping elements has been adapted for varied usage as a cultivator, subsoil weed cutter, and wheelbarrow by rapid adjustment and/or affixure of selected elements.

SUMMARY OF THE INVENTION

This invention relates to an improved garden implement device having multiple capability in that it is usable for various cultivating and plowing activities as well as in the capacity of a cartage or hauling implement. The device consists basically of a hand powered wheeled frame which includes adjustable and attachable devices including a cultivator implement, subsoil plane cutter and, with 180° reversal of the hand frame, the implement may receive a cartage bed in the manner of a wheelbarrow.

Therefore, it is an object of the present invention to provide a combination garden implement having multiple capabilities.

It is still another object of the present invention to provide a combination garden implement which enables numerous garden capabilities at great reduction in cost.

Finally, it is an object of the present invention to provide a combination device which is readily adjustable and adaptable for varied usage in and around the garden and yard.

Other objects and advantages of the present invention will become apparent to those skilled in the art from a reading of the following detailed description as understood in conjunction with the accompanying drawings.

BRIEF DESCRIPTION OF THE DRAWINGS

FIG. 1 is a side elevation of the invention;

FIG. 2 is a bottom view of the invention;

FIG. 3 is a perspective view of the invention when adjusted in a first operational attitude;

DETAILED DESCRIPTION OF THE INVENTION

Figure 4:
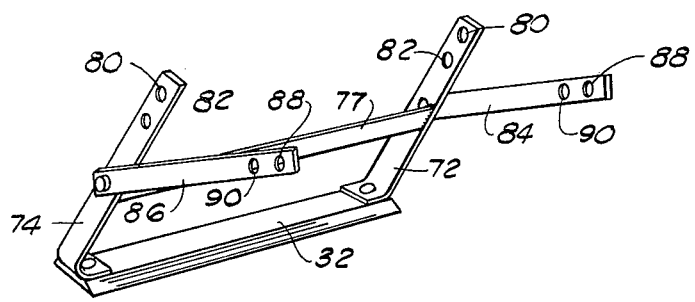
FIG. 4 is an enlarged perspective view of the subsoil blade of the present invention.

Referring now to FIGS. 1 and 2, the implement 10 consists of a support wheel 12 rotatably mounted on an axle 14 conventionally supported between fork frames 16 and 18. A pair of angularly diverging manipulative frame members 20 and 22 then extend therefrom terminating in handlebar portions 24 and 26, respectively. The handlebar portions 24 and 26 are shown up-curved in FIG. 1; however, the configuration and gripping elements relative to this structure may be formed in any suitable manner.

The fork frame members 16 and 18 are formed to extend upward into an outward right angle bend to provide eventual support of a cultivator and subsoiler implement 28, as also shown in cultivator attitude in FIG. 3. The implement 28 includes a plurality of cultivator teeth or sweeps 30 as well as a subsoiler blade 32, as will be further described below. A lateral brace 34 (FIG. 3) is secured as by welding between the outer ends of fork braces 16 and 18 and is adapted to carry one of the cultivator blades 30 generally central thereof. Each of fork frames 16 and 18 are further adapted to have yet another reverse right angle bend portion 36 and 38, respectively, at the outer end thereof, and respective support bars 40 and 42 are secured as by welding to manipulative frame members 22 and 20 while further being fastener fixed to respective end portions 36 and 38 of fork frames 18 and 16.

Support bars 40 and 42 provide a clamping support for a cartage bed 44 as secured for readily releasable disposition by respective wing nut clamps 46 and 48 and spring clamps 50 and 52 secured beneath cartage bed 44. When in the wheelbarrow attitude, tubular receivers 54 and 56 receive respective support legs 58 and 60 in force fit and each carries a respective ground contact foot 62 and 64. Additional lateral support is provided by a plurality of cross frame members 66, 68 and 70 equi-spaced and secured as by welding between manipulative frame members 20 and 22. While particular conventional framing support and affixure methods are utilized, it should be understood that the number of supports, type of securing method and angular bracing method are a matter of choice within the skill of the art.

The cultivation implement 28 is an adjustable cultivator and subsoiler which is secured between the outer end portions 36 and 38 of fork frames 18 and 16, respectively. Thus, side braces 72 and 74 (FIG. 3) are rotatably fixed to the outer ends of frame portions 36 and 38 at hinge points 76 and 78 with opposite ends secured rigidly to cutter bar 32. This is shown to additional advantage in FIG. 4. Lateral brace 77 is rigidly secured between side frames 72 and 74 to provide structural rigidity, and further support is provided by a lateral frame 79 (FIG. 3) which is secured as by welding between the distal ends of fork frame portions 36 and 38 just forward of pivot points 76 and 78. The rearmost lateral brace 79 is then adapted to carry one or more laterally adjustable sweep or cultivator teeth 30. In most applications it is desirable to have a V-offset type of sweep arrangement carrying an odd number of cultivator teeth 30.

FIG. 4 illustrates in enlargement the cutter bar 32 portion of cultivator implement 28. Thus, cutter bar 32 is secured to upright frame members 72 and 74, each of which has a pair of equi-spaced and similarly disposed fastening holes 80 and 82 which provide subsoil depth adjustment depending upon which of holes 80 and 82 are aligned with respective pivot affixures 76 and 78 (see FIG. 3). The attitude rigidity is provided by a pair of angle braces 84 and 86 each rotatably secured centrally aong frames 74 and 72, respectively, and each including an additional pair of equi-spaced similarly disposed securing holes 88 and 90. Selected ones of holes 88 and 90 are secured at base 92 and 94 of respective frame supports 40 and 42 by readily operative fasteners in order to provide an adjustable setting for cutter blade 32.

Figure 5:
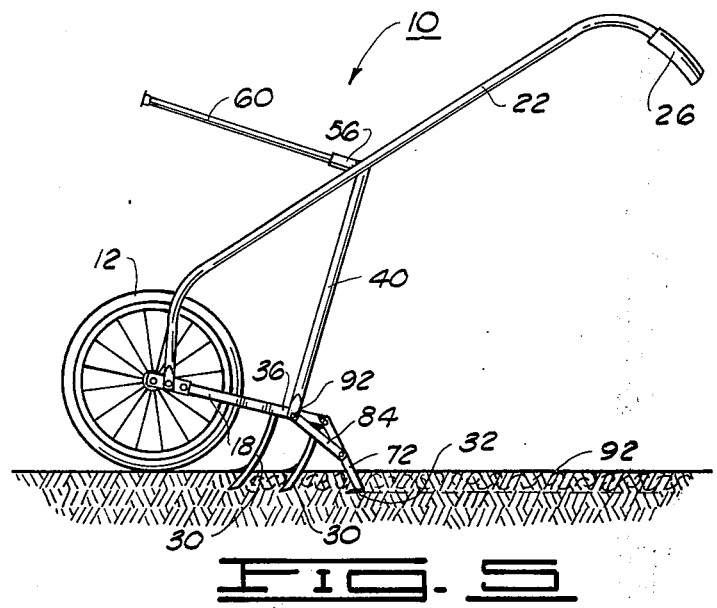
FIG. 5 is a side elevation of the invention in cultivating operation.

FIG. 5 illustrates the implement 10 when adapted for cultivation and subsoiler duty, wherein cultivator teeth 30 may be moved through soil 92 at specified depth as controlled by height of manipulative handle portions 24 and 26 during motion. Subsoiler cutter bar 32 will also then trail in constant relationship at a depth below surface 92, as adjusted by affixure of angle bars 84 and 86 (see FIG. 4), to cut off all weeds across the length of its swath after soil loosening by the cutter teeth 30. Such a manual garden implement can be of untold value in bringing about proper tillage of small garden plots. The support legs 60 and 62 are easily removable, if desired, when implement 10 is utilized in the cultivation attitude.

Figure 6:
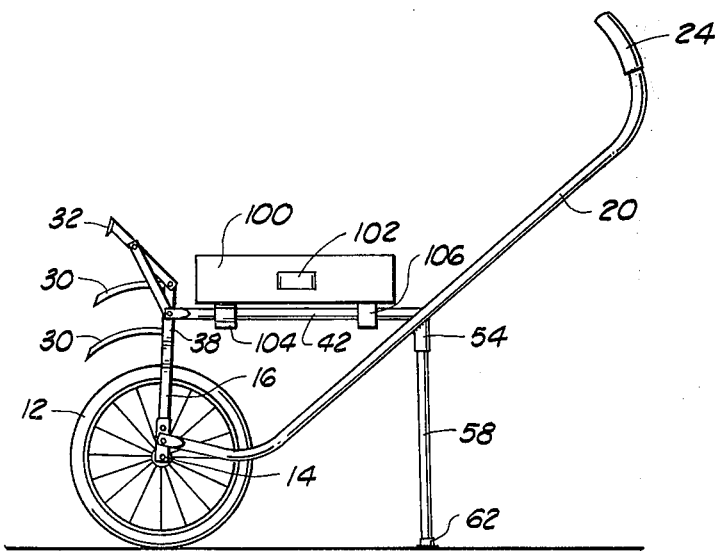
FIG. 6 is a side elevation of the invention when carrying an alternative form of cartage implement.

FIG. 1 illustrates the implement 10 when it is turned over or reversed to carry the cartage bed 44 in readily affixed manner thereby to function as a wheelbarrow type of implement. Thus, the cultivator portion of the apparatus is moved up and in non-interfering relationship with the remainder of the apparatus as it becomes a handy wheelbarrow for additional garden duties. FIG. 6 illustrates an alternative form of cartage bed 100 having a pair of oppositely disposed handles 102 which render it extremely useful for flower plot and other lesser cartage duties around the yard or garden plot. In this case, it is contemplated that cartage bed 100 be supported on each of horizontal braces 42 and 40 (FIG. 3) by means of a forward disposed spring clamp 104 and a rearward disposed guide member 106 since it is particularly desirable that this form of manipulable cartage bed 100 be readily removable from the wheeled frame for transport in and about the flower or bedding plant garden and the like.

The foregoing discloses a novel garden implement of varsatile capability both as a cultivating and weeding tool and a cartage implement for general use. When used in cultivation attitude, the implement has necessary adjustment which enables selection of cultivation depth and/or width and the trailing subsoil cutter bar is susceptible of height adjustment to provide yet another dimension of operative adaptability. The implement is then able to be reversed relative to its support wheel whereupon a selected form of cartage bed is readily affixed thereon in ruggedly supported manner to perform any number of garden hauling chores with little or no interference from remaining implement structure.

Changes may be made in the combination and arrangement of elements as heretofore set forth in the specification and shown in the drawings, it being understood that any changes made in the embodiments disclosed without departing from the spirit or scope of the invention as defined in the following claims.

What is claimed is:

1. A combination garden implement usable through dual orientation for cultivation, subsoil clearance and cartage capabilities comprising:

a support wheel;

a pair of fork frame means each rotationally supported from said support wheel on opposite sides thereof and extending transversely co-planar, right angle bend portions outward from said support wheel;

manipulative frame means which is generally elongated and affixed to said fork frame means proximate said support wheel, the elongated manipulative frame means being secured to said fork frame means and formed at a bend to extend at an angle of approximately 45° from the plane of said fork frame means, said manipulative frame means further consisting of a pair of diverging elongated bars affixed on opposite sides relative to said wheel means and including plural transverse frame bars rigidly secured therebetween in spaced relationship;

plural transverse bars affixed in generally parallel, spaced disposition between said fork frame means right angle bend portions;

at least one cultivating means secured to each of said transverse bars to extend into ground contacting attitude when said implement is oriented for cultivation;

a pair of side braces each having first and second ends with respective first ends each secured at a predetermined angle to a respective first and second fork frame means right angle bend portion;

blade means rigidly secured between the second ends of said side braces in subsoil contacting relationship when said implement is oriented for cultivation;

first and second support bar means affixed between respective opposite right angle bend portions and respective ones of said diverging elongated bars of said elongated manipulative frame means; and cartage bed means consisting of a rigid container having a bottom surface and enclosing side surfaces and securing means affixed therebeneath for releasable affixure to said support bar means.

2. An implement as set forth in claim 1 which further includes:

support leg means removably secured to said manipulative frame means generally at the joinder of said support bar means and on the opposite side therefrom such that said support leg means provide ground contacting support of the implement in the cartage attitude.

* * * * *